April 17, 1951     F. W. DE JAHN     2,548,876
REDUCTION FURNACE
Filed Aug. 6, 1946     3 Sheets-Sheet 2
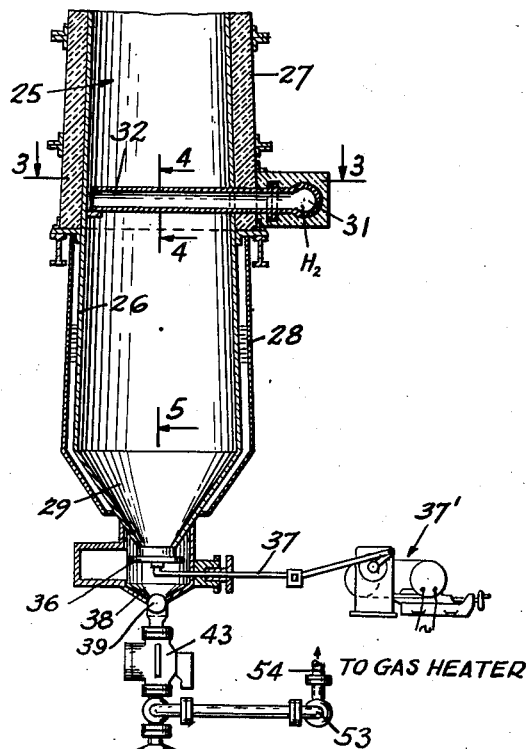
FIG.1A.
FIG.4.
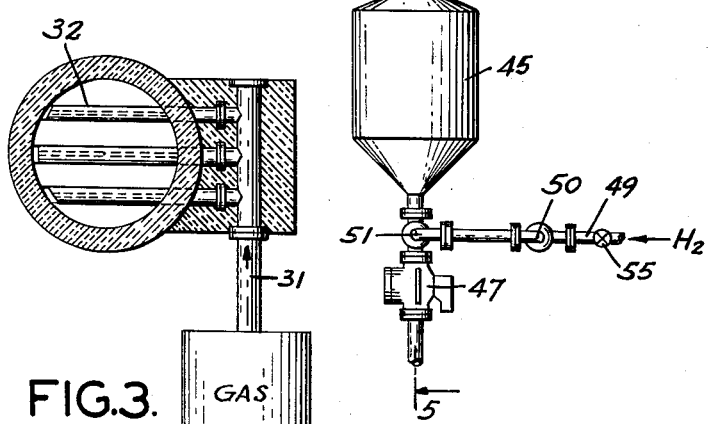
FIG.3.
INVENTOR.
FREDRIK W. DE JAHN
BY
*Campbell, Brumbaugh & Lee*
ATTORNEYS.

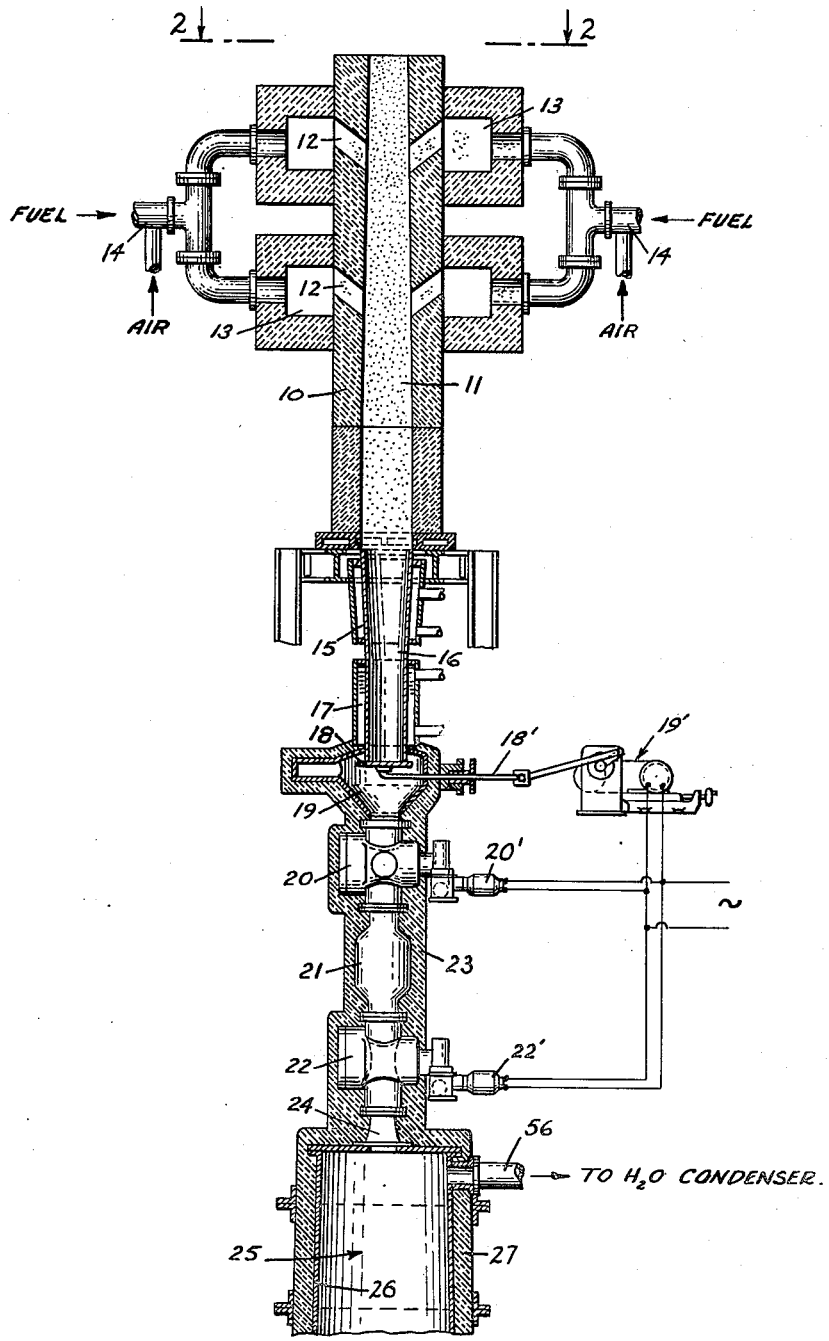

April 17, 1951  F. W. DE JAHN  2,548,876
REDUCTION FURNACE
Filed Aug. 6, 1946  3 Sheets—Sheet 3

INVENTOR.
FREDRIK W. DE JAHN
BY
Campbell Brumbaugh & Free
ATTORNEYS.

Patented Apr. 17, 1951

2,548,876

UNITED STATES PATENT OFFICE 2,548,876

REDUCTION FURNACE

Fredrik W. de Jahn, New York, N. Y., assignor to H. A. Brassert & Company, New York, N. Y., a corporation of Illinois Application August 6, 1946, Serial No. 688,644

2 Claims. (Cl. 266—9)

This invention relates to the reduction of metallic oxides, and has particular reference to apparatus for the direct reduction of oxides of the iron group without fusion, but the invention is not limited to that group.

Although iron oxides may be reduced without fusion by means of a reducing gas, such as hydrogen, at reducing temperatures, providing the oxides are sufficiently finely-divided to permit reasonably rapid and substantially complete reduction under very closely-controlled temperature conditions, the particles stick together and clog the reducing furnace. It has been found that the sticking problem in the reducing zone may be minimized by forming the finely-divided oxides into special small units obtained by agglomerating the material with water without compaction and then baking the resulting nodules under quiescent conditions and at such temperatures that the nodules have high porosity and sufficient strength to withstand handling in subsequent processing equipment without substantial breakage. As described in copending application Serial No. 621,854, now abandoned, filed October 11, 1945, by H. A. Brassert and applicant, the sticking problem can be virtually eliminated if the wet nodules so formed are not merely baked but are calcined at temperatures higher than is necessary to merely harden them, i. e., from 1050° to 1350° C., until most of the magnetic iron oxide in the nodule is converted into hematitic oxide. Such conversion to hematite has the additional advantage that the oxide may be reduced with hydrogen at a rate three to four times as fast as magnetite, with a correspondingly smaller volume of hydrogen. Such subsequent reduction may be conducted at temperatures between about 700° to 1000° C. and, with hydrogen as the reducing agent, substantially completely reduced nodules result, which, although slightly smaller due to shrinkage, retain substantially their original shape, integrity and porosity so that they may be readily gravity-fed, are easily crushed and ground, or otherwise treated for various purposes required.

Continuous operation with conservation of heat between the baking and calcining of the wet nodules and their reduction is desirable, but measuring and feeding equipment is required between these stages in order to prevent hydrogen leakage and to maintain proper flow of a charge through the reducing furnace so that the nodules may be completely reduced by the time they reach the point of discharge. Although there has been much improvement in construction of valves, gates, and measuring equipment, these all require proper lubrication but to date no satisfactory lubricant has been developed which will stand temperatures higher than about 600° C. without deterioration. Consequently, where continuous production is required, the inability of the lubricant for valves, feeding mechanisms, and the like, to stand the temperatures to which it would be subjected under the conditions contemplated, presents a considerable problem.

In accordance with the present invention, apparatus for the production of reduced metallic oxides in the form of nodules as a continuous operation, from and including the baking and calcining of the wet nodules, is provided, in which available valve, gate, measuring, feeding and other equipment may be used without thermal damage thereto and without interruption of the substantially continuous feed to and discharge from the reducing furnace, and whereby substantial thermal economy is maintained.

In a preferred embodiment of the invention, the nodule baking and calcining furnace is arranged immediately above or as a vertical extension of the shaft of the reducing furnace, with automatic mechanism for feeding and measuring the nodules being interposed between them so that gravity feed is used throughout with consequent advantages of low power consumption, compactness, and thermal economy. More particularly, the nodule baking and calcining furnace comprises a shaft, preferably of fire brick or its equivalent, in which the nodules are baked and calcined by combustion of bleed gas from the hydrogen recirculating system or other fuel at a temperature of about 1300° C. The baked and calcined nodules descend by gravity at a temperature of from 900° to 1000° C. through cooling jackets which cool them to about 600° C., the highest safe temperature at which they can be handled by the current measuring and feeding apparatus, which is interposed between the nodule baking and calcining furnace and the reducing furnace.

More particularly, the mechanism for feeding and measuring the baked and calcined nodules consists of a reciprocating horizontal gate which gradually increases the flow of the baked nodules to a predetermined degree and then gradually decreases the flow until a measuring chamber below is filled, this chamber being separated from both furnaces by corresponding gas valves, the upper one of which is opened to admit the charge of nodules to the measuring chamber while the other valve between the measuring chamber and the reducing furnace remains closed to serve as a gas lock precluding the flow of gaseous reduction products upwardly into the baking and calcining furnace. After the measuring chamber has been filled, the nodule feeder gate stops in closed position, the valve between it and the measuring chamber is closed and the valve between the measuring chamber and the reducing furnace is opened to discharge the contents of the measuring chamber into the reducing furnace. This cycle of operations is then repeated and is such that the measuring chamber is charged and discharged on the order of once every five minutes, so that, although the feed to the reducing furnace is intermittent, it occurs with sufficient frequency that the reducing furnace is continually full.

The charge of baked and calcined nodules is reduced in the vertical shaft reducing furnace by preheated hydrogen, preferably admixed with an inert gas, so that the volume of hydrogen circulated is not inordinately large, as described in copending application Serial No. 684,714, now abandoned, filed July 19, 1946, by applicant. The hydrogen is admitted toward the lower end of the shaft after preheating to a temperature on the order of 1000° C. and the nodules are accordingly reduced by the hydrogen at a temperature on the order of 800° C., as they gradually descend by gravity through the furnace shaft. The resulting iron nodules are discharged by a motor-operated horizontal feed gate similar to the feed gate supplying the baked nodules thereto and operating in synchronism therewith. Preferably, the iron nodules, still protected from oxidation, are cooled below the pyrophoric range by suitable means such as hydrogen, which is accordingly preheated by heat exchange with hot nodules and may be added to the reducing furnace feed gas after heating to the desired temperature, say 1000° C., as stated.

It will be seen that the apparatus of this invention for reducing metallic oxides is simple and economical in construction and operation, and enables the efficient use of finely-divided oxides to produce high grade technical iron without fusion, this iron being useful for the powdered metal industry, as well as for melting and casting, or mixing with alloying materials to form various metal alloys.

For a more complete understanding of the invention, reference may be had to the accompanying drawings, in which:

Figures 1 and 1A jointly constitute a vertical section as seen along the line 1—1 of Fig. 2, through the combined nodule baking and calcining furnace, the feeding mechanism and the reducing furnace, arranged according to the present invention;

Fig. 3 is a transverse section through the reducing furnace, as seen along the line 3—3 of Fig. 1A, showing the arrangement of the reducing gas feeding tubes;

Fig. 4 is an enlarged transverse section through one of the enlarged gas feed tubes, as seen along the line 4—4 of Fig. 1A.

Figure 2:
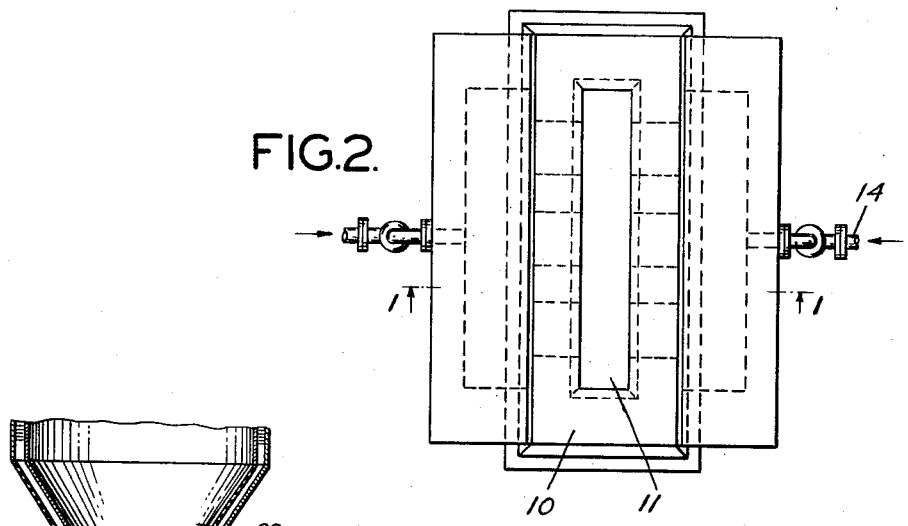
Fig. 2 is a plan view of the baking and calcining furnace as seen along the line 2—2 of Fig. 1.
Figure 5:
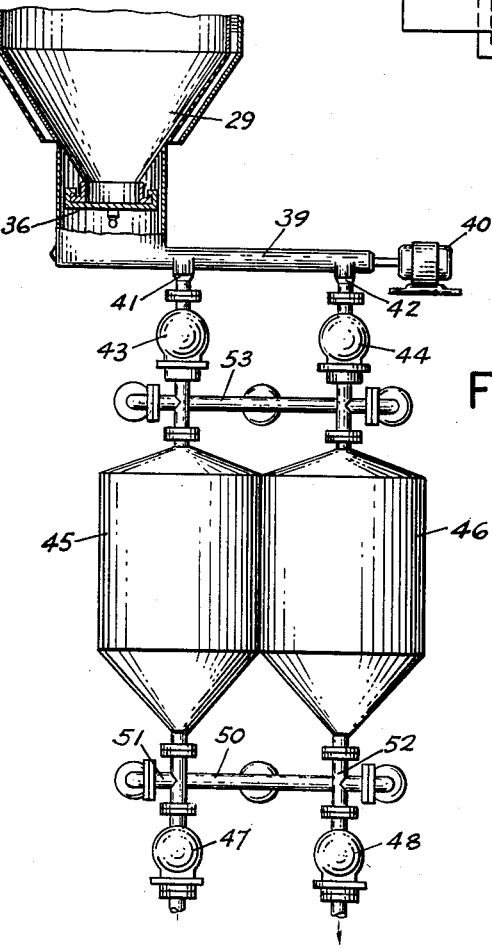
Fig. 5 is a vertical view partly in section through the lower end of the reducing furnace and the reduced nodule feed and cooling mechanism arrangement, as seen along the line 5—5 of Fig. 1A.

Referring to Figs. 1 and 2, numeral 10 designates a vertical shaft of rectangular cross-section lined or formed of fire brick or other refractory material and having a center rectangular passage 11 which tapers upwardly from say seven and a half to seven feet in horizontal length and one and one-half feet to one foot in width. Leading into this passage, preferably directed downwardly, are a series of firing ports 12 supplied from gas manifolds 13 to which lead fuel gas feed pipes 14, the gas being bleed gas from the hydrogen reducing gas recirculating system or other fuel, depending upon availability. The wet nodules, preferably agglomerated by suitable means located at the upper end of the shaft passage 11 are discharged thereto and heated as described to a temperature on the order of 1300° C. The resulting nodules are baked to a self-sustaining hardness and are simultaneously calcined to hematite and are then gravity-discharged from the shaft 10 at a temperature of between about 900° C. and about 1000° C.

Inasmuch as the available lubricants for the gates, valves and measuring equipment cannot withstand temperatures materially in excess of 600° C., the nodules are cooled down to that temperature, preferably in two stages, first in the air jacket 15 that surrounds the steel nodule discharge tube 16, and second, by a water-cooled jacket 17 that also surrounds the tube 16 and which reduces the temperature of the nodules to approximately 600° C. at its lower end. The heat exchanged in this manner may be utilized, as for example by circulating reducing gas through jacket 15 so that preheating of the gas prior to the high heating in the gas heater may be effected, as is well understood.

The lower end of the nodule discharge tube 16 is normally closed by a gate 18 which is reciprocated horizontally by a shaft 18' connected to a motor-driven crank and variable speed mechanism 19', so that the baked nodules are discharged into hopper 19 at gradually increasing and then decreasing rates, each cycle occurring at periodic intervals. An electrically-operated gas valve 20, which is open when gate 18 is discharging nodules into hopper 19, separates the latter from a measuring chamber 21 and is automatically operated by an electrically-controlled motor mechanism 20', so as to operate in synchronism with the gate operating mechanism 20 in the manner to be described.

Measuring chamber 21 is adapted to contain a predetermined quantity of the baked nodules and is closed at its lower end by a gas valve 22 similar to a gas valve 20 and operated by mechanism 22', in synchronism therewith, so that gas valve 22 is closed when gas valve 20 is open, and vice versa, whereby the flow of gaseous reduction products from the reducing furnace to the baking and calcining furnace during feeding of the nodules to and from the measuring chamber 21 is precluded. Hopper 19, valve 20, measuring chamber 21 and valve 22 are preferably enclosed in an insulating jacket 23 to conserve the heat of the nodules so that they remain at approximately 600° C. down to the reducing furnace.

The measured quantity of baked and calcined nodules is discharged by measuring chamber 21 periodically through open valve 22 into feed pipe 24 leading to the upper end of the vertical shaft reducing furnace 25, which may be on the order of 22 feet in overall inside height and have a widest diameter of about five feet at its lower bosh-like portion from which it tapers upwardly to a minimum diameter of about four feet at the top and downwardly into a hopper-like bottom 29. Other proportions and dimensions may be utilized, depending upon requirements. The furnace 25 preferably consists of an alloy steel liner 26 and an insulating casing 27 extending downwardly about twelve feet from the top, below which the liner 26 is enclosed in a water jacket 28 for again cooling the nodules after reduction down to a handling temperature of about 600° C., this water jacket 28 extending downwardly to at least partly enclose the conical bottom 29 of the furnace 25.

The reducing gas, preferably hydrogen with or without an admixed heating gas such as nitrogen for the purpose described, at about 1000° C., is supplied through the gas heater 30, shown schematically in Fig. 2, and thence to manifold 31, feeding three, more or less, gas tubes 32 extending horizontally across furnace 25 at a point just above the upper end of water jacket 28. Gas tubes 32 are preferably of inverted tear-drop cross section, as shown in the enlarged section constituting Fig. 4, with a gas slot 33 in its lower edge, through which the hot reducing gas issues to percolate upwardly between and through the porous nodules descending by gravity in the shaft of reducing furnace 25. The enlarged upper end 35 of each gas tube 32 spreads the descending nodules so that the nodules do not pack around and thus clog the gas slot 33 from which the gas flows for percolation through and between the nodules, as described.

Reduction of each nodule takes place without fusion at about 700–900° C. during the period of one hour, more or less, depending upon temperature, nature of the oxide, reducing gas concentration, and the like, i. e., in its slow course downwardly through the furnace each nodule is reduced to iron.

The lower aperture at the apex of the reducing furnace cone 29 is normally closed by a gate valve 36 which is oscillated horizontally by shaft 37 actuated by variable speed driving mechanism 37' similar to gate mechanism 19' and operating in synchronism therewith, so that the same quantity of reduced nodules is discharged from furnace 25 within a given period of time, as is introduced therein by gate 18 and valves 20 and 22, with due consideration given to the smaller volume of each reduced nodule due to shrinkage during reduction. That is to say, gate 36 operates at such rate compared to gate 18 that furnace shaft 25 is always full of nodules, compensation being made for decrease in volume, as described. The reduced nodules discharged through gate 36 from the furnace cone 29 and cooled to about 600° C. by reason of the water jacket 28, collect in hopper 38 from which they are discharged by a screw conveyor 39 driven by an electric motor 40 and feeding the nodules to two discharge pipes 41 and 42 leading through respective gas valves 43 and 44 to storage bins 45 and 46 whose discharge is controlled by gates 47 and 48, respectively.

Because the iron nodules are pyrophoric at around 600° C., they must be cooled further and that is preferably done in bins 45 and 46 by circulating a non-oxidizing gas therethrough, such as hydrogen or other reducing gas, which may be preheated by heat exchange with the nodules before being supplied to the gas heater 30. This cooling gas is furnished by a hydrogen supply pipe 49 leading to a manifold 50 feeding into the lower end fittings 51 and 52 of bins 45 and 46, respectively. After percolating through the hot iron nodules in bins 45 and 46, the heated gas is collected from their upper ends by manifold 53 and thence led by pipe 54 to the gas heater 30 feeding hot reducing gas to the furnace through manifold 31 and gas tubes 32 as described. Gas valves 43 and 44 are normally closed to prevent the cooling gas from flowing upwardly through the furnace 25 unnecessarily when the gate 36 is open. These valves are closed when the material in the bins is being cooled but are opened to fill the bins, the cooling gas being shut off by valve 55 when the bins are being filled and also when they are being emptied. The iron nodules, cooled down near room temperature, are drawn by gravity from bins 45 and 46 by opening gates 47 and 48.

The off-gas from the reducing operation is drawn from the top of reducing furnace 25 by pipe 56. Inasmuch as it contains unoxidized reducing gas it may be recycled and replenished with fresh reducing gas, after removal of the spent reducing gas, which, in the case of hydrogen reductant, is water vapor and readily condensed out as described in said copending application Serial No. 684,714.

Operation of the substantially continuous nodule baking, calcining, and reducing system of this invention will be readily understood from the foregoing description of its construction and functioning. For convenience, it may be summarized as follows: The baked nodules, preferably formed without compaction at a point adjacent the upper end of the baking furnace shaft 10 are fed thereto, baked and calcined during their passage downwardly by gravity therethrough, at a temperature on the order of 1300° C., cooled by jackets 15 and 17 to a temperature of about 600° C., fed automatically and intermittently by gate 18 to measuring chamber 21 while gas valve 20 is open and gas valve 22 is closed, further fed after measuring in measuring chamber 21 through open gas valve 22, while gas valve 20 is closed, to the upper end of reducing furnace 25 in which the baked and calcined nodules are reduced to metallic iron by hydrogen or other reducing gas fed thereto through gas tubes 32, the gas being preheated to a temperature of about 1000° C. so that the nodules are raised in temperature to approximately 800° C., more or less, for reduction by the heated hydrogen.

The reduced nodules are cooled in the lower end of the shaft of reducing furnace 25 by water jacket 28 to a temperature of approximately 600° C. and are discharged by gate 36 automatically but intermittently to hopper 38, from which they are fed by screw conveyor 39 to the storage bins 45 and 46 through open gas valves 43 and 44 while nodule discharge valves 47 and 48 are closed. After the bins 5 and 6 are filled, gas valves 43 and 44 are closed and a cool non-oxidizing gas, such as hydrogen, is percolated through the hot nodules upon opening valve 55, so that the nodules are cooled to below the pyrophoric range and are then discharged from bins 45 and 46 by gates 47 and 48, after the flow of hydrogen through the bins has been stopped by closing valve 55. After emptying the bins 45 and 46, gates 47 and 48 and gas valves 43 and 44 are again closed and reopened for receiving the hot iron nodules from screw conveyor 39 to repeat the cooling and discharge cycle. Although operation is necessarily intermittent to preserve the gas seals, the flow of the nodules is actually continuous because the operation of gates 18 and 36, the valves 20, 22, 43, 44, 47 and 48 is synchronized so that continuous flow results. By varying the speed of operation of gates 18 and 36, the rate of feed of the nodules to and from the reducing furnace 25 may be adjusted to accord with the optimum reduction rate. Also, the electric operating units 20' and 22' for valves 20 and 22 which operate alternately are controlled by electric timing mechanism of well-known construction and operate in synchronism with gate mechanism 19' as described.

Although a preferred embodiment of the invention has been illustrated and described herein, it is to be understood that the invention is not limited thereby but is susceptible of changes in form and detail within the scope of the appended claims.

I claim:

1. In apparatus for making primary metal products from nodules molded from the oxide of said metal in finely-divided form, the combination of reducing furnace shaft, a baking furnace shaft having a nodule outlet positioned at a higher level than the nodule inlet to said reducing furnace shaft for gravity-feeding the nodules after baking in said baking furnace directly to said reducing furnace, a first valve interposed between said furnaces for feeding said nodules from the baking furnace to the reducing furnace, a cooling jacket between said baking furnace shaft and said first valve for cooling said nodules, motive means for opening and closing said gate to regulate the flow of nodules between said furnaces, a measuring chamber interposed between said first valve and said reducing furnace for receiving said nodules, a second valve interposed between said measuring chamber and said reducing furnace and driven in timed relation with said first valve for discharging the nodules from said measuring chamber to said reducing furnace, and a gas valve interposed between said measuring chamber and said first valve for preventing flow of gas from said reducing furnace to said baking furnace when said second valve is open.

2. In apparatus for at least partially reducing substantially uniformly-sized metallic oxide units, the combination of a lower chamber, an upper chamber having an inlet for introducing said units into said upper chamber and an outlet for said units positioned at a higher level than the inlet to said lower chamber for gravity-feeding the said units directly to said lower chamber, a valve between said chambers for regulating the feed of said units from said upper chamber to said lower chamber, a second valve at the upper end of said upper chamber, means including a cooling jacket surrounding the lower end of said lower chamber, means for introducing a reducing fluid to the lower portion of said lower chamber but above the cooling jacket thereof, and a third valve for regulating the discharge of said units from the lower jacketed end of said lower chamber.

FREDRIK W. de JAHN.

REFERENCES CITED

The following references are of record in the file of this patent:

UNITED STATES PATENTS

| Number | Name | Date |
|---|---|---|
| 817,414 | Brown | Apr. 10, 1906 |
| 1,121,559 | Heslewood | Dec. 15, 1914 |
| 1,279,181 | Tracy | Sept. 17, 1918 |
| 1,448,340 | Fleischer | Mar. 13, 1923 |
| 1,542,966 | Samuel | June 23, 1925 |
| 1,599,885 | Grace | Sept. 14, 1926 |
| 1,628,012 | Tracy | May 10, 1927 |
| 1,849,658 | Brassert | Mar. 15, 1932 |
| 1,979,729 | Brown | Nov. 6, 1934 |
| 2,088,165 | Erdmann | July 27, 1937 |
| 2,231,760 | Foerster, Jr., et al. | Feb. 11, 1941 |
| 2,340,346 | Riveroll | Feb. 1, 1944 |
| 2,404,944 | Brassert | July 30, 1946 |